United States Patent [19]
Graff et al.

[11] 3,830,360
[45] Aug. 20, 1974

[54] APPARATUS FOR TRANSFERRING MOLDED PRODUCTS TO A TRIMMING MACHINE

[75] Inventors: Lars U. Graff, Okemos; William A. Scott, Chelsea, both of Mich.

[73] Assignee: Haskon Incorporated, Wilmington, Del.

[22] Filed: Sept. 13, 1972

[21] Appl. No.: 288,727

[52] U.S. Cl.............. 198/20, 198/33 AD, 198/34, 425/DIG. 232
[51] Int. Cl............................................ B65g 47/00
[58] Field of Search......... 198/20, 33 R, 33 AD, 34; 425/DIG. 203, 232

[56] References Cited
UNITED STATES PATENTS

| | | | |
|---|---|---|---|
| 2,755,611 | 7/1956 | McGihon | 198/34 |
| 3,065,839 | 11/1962 | Piazze | 198/20 R |
| 3,081,859 | 3/1963 | Meyer et al. | 198/20 R |
| 3,101,830 | 8/1963 | Webster | 198/34 A |
| 3,108,681 | 10/1963 | Sanchez | 198/20 R |

*Primary Examiner*—Richard A. Schacher
*Assistant Examiner*—Richard K. Thomson
*Attorney, Agent, or Firm*—Finnegan, Henderson, Farabow and Garrett

[57] ABSTRACT

Apparatus for automatically transferring a plurality of molded, handle-ware plastic products simultaneously discharged from a molding machine in an upright, spaced-apart position to a horizontal, closely-spaced position for feeding to a handle-ware trimming machine.

10 Claims, 10 Drawing Figures

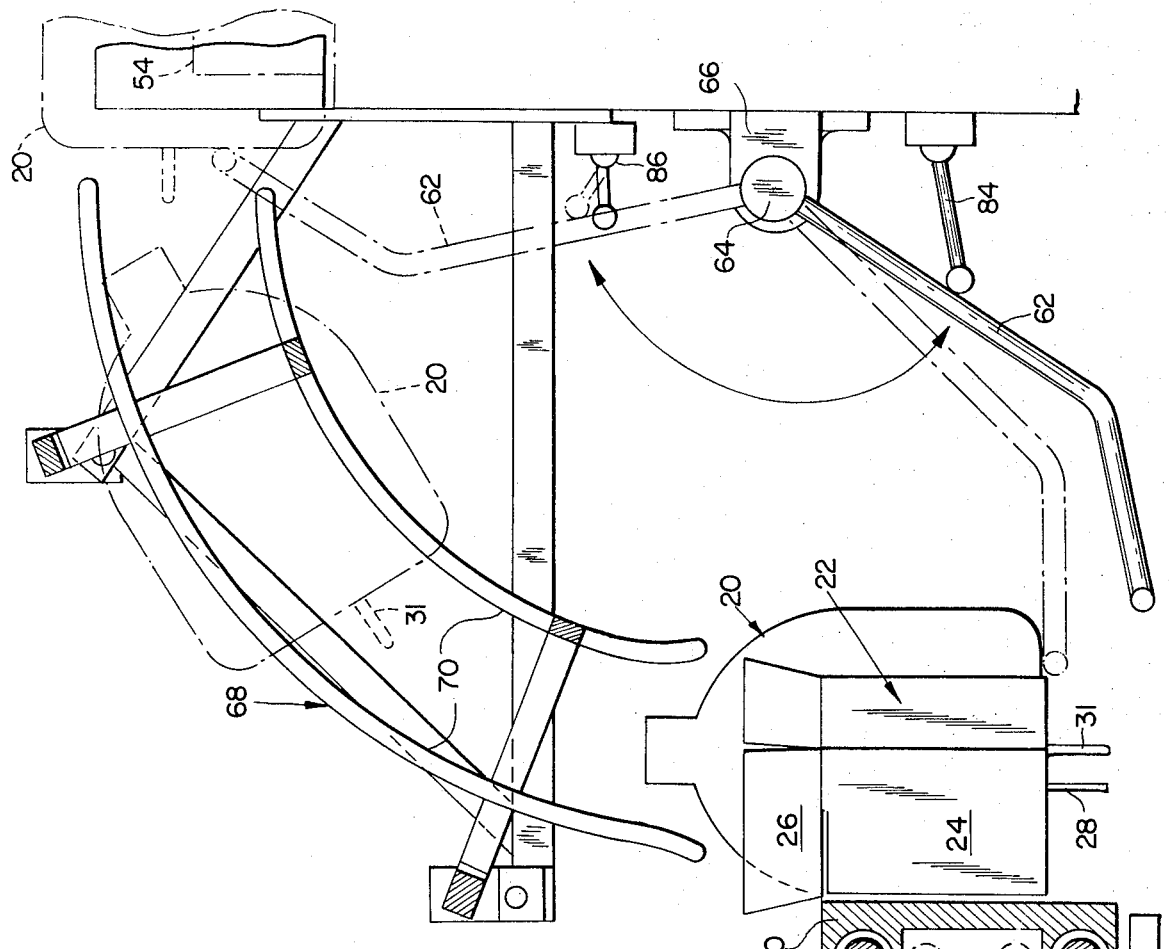
FIG. 5
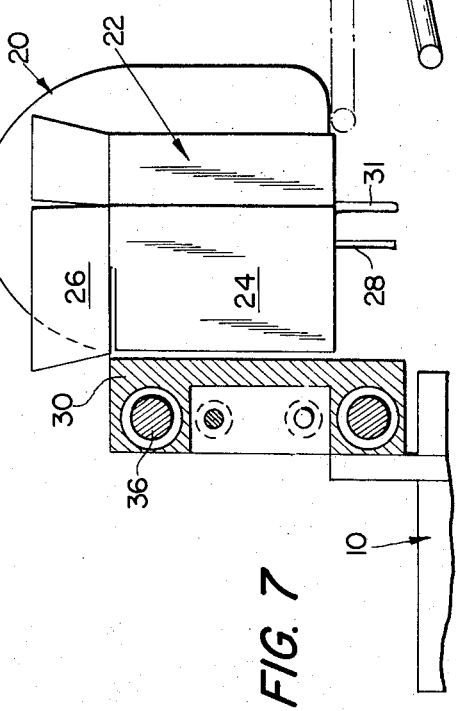
FIG. 7
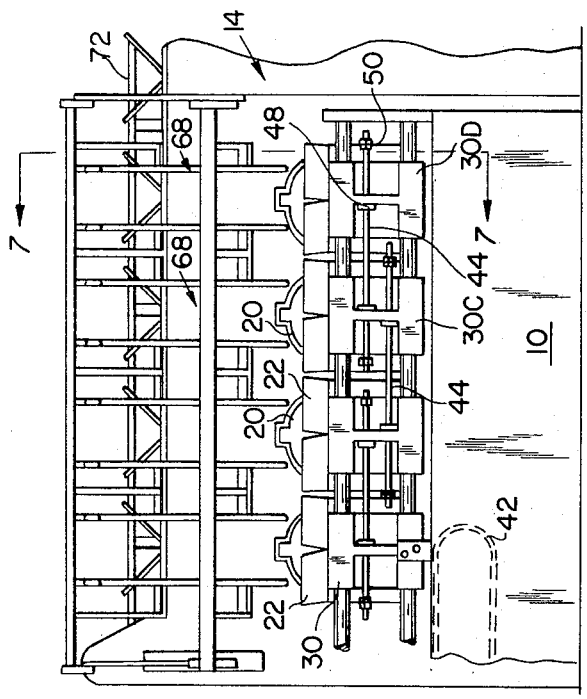

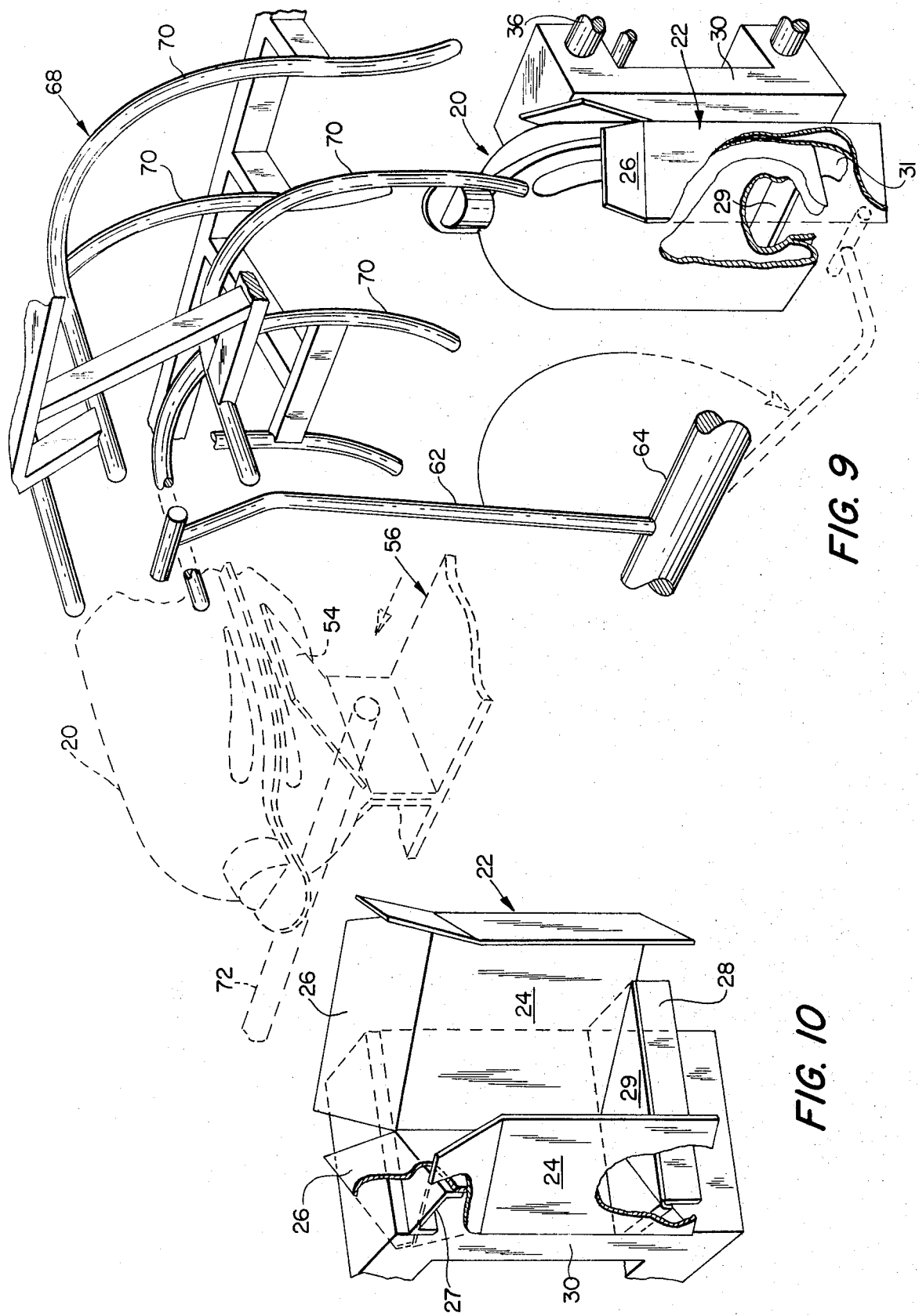

APPARATUS FOR TRANSFERRING MOLDED PRODUCTS TO A TRIMMING MACHINE

This invention relates to apparatus for use in the manufacture of molded plastic products. More particularly, this invention relates to apparatus for automatically transferring a plurality of handle-ware molded containers simultaneously discharged from a blow-molding machine to a handle-ware trimming machine to provide a system for the continuous manufacture of the containers ready for storage or filling.

Many types of apparatus exist for the production of molded plastic products. By way of example, this invention will be illustrated as it relates to a blow-molding machine for producing hollow articles, such as jugs, bottles, containers or the like. It will be readily appreciated to those skilled in the art, however, that the invention is also suitable for use with other molding machines that simultaneously produce a plurality of molded plastic products that must be deflashed before use.

Typically in a blow-molding machine, a plurality of parisons of a soft plastic material are extruded between open mold halves, the molds are then closed about the parisons, and the parisons are expanded within the closed molds by the injection of air to form hollow articles. Upon curing, the molds open and the formed articles drop down out of the molds in a substantially upright and spaced-apart position. The discharged articles have base and neck flash left over from the molding operation, and this flash is generally removed by passing the articles over an impacting mechanism that simply knocks off the excess plastic material.

In the manufacture of handle-ware containers, however, where a handle for the convenience of the user is molded directly onto the container, such impacting apparatus is not capable of removing the flash between a handle and the container. Instead, it is necessary to hold each container individually in a press and punch out the handle-ware flash. In the past, however, it has been necessary for an operator to hand feed the handle-ware containers into such presses, because the orientation as well as the spacing between the plurality of containers simultaneously discharged from the molding machine was different from the orientation and spacing of the containers required in the handle-ware trimming apparatus.

Accordingly, it is an object of the present invention to provide apparatus for automatically transferring the containers from the molding machine to the trimming mechanism while simultaneously orienting the containers to the proper spacing and position for the trimming machine, thereby providing a system for the continuous manufacture of the containers from extrusion to completed container ready for storage or filling.

In accordance with the foregoing object, and as embodied and broadly described, there is provided in combination with a blow-molding machine and apparatus for punch trimming a series of blow-molded, handle-ware, plastic containers, apparatus for transferring the containers discharged from the molding machine in an upright, spaced-apart position to a horizontal and differently spaced-apart position for feeding to the trimming machine. The transfer apparatus comprises container-holding means located at a container-receiving station for receiving the plurality of containers simultaneously discharged from the molding machine; transfer means reciprocating the container-holding means to a container-removing station remote from the molding machine and back again; spacing means for adjusting the spacing between the container-holding means during movement to the container-removing station to the spacing required in the trimming machine; and guide means located at said container-removing station for receiving containers removed from the container-holding means and orienting them to a horizontal position for feeding to the trimming machine.

Preferably, the trimming machine has a feeding mechanism comprising a plurality of troughs for holding the containers to be trimmed in a horizontal mode and that moves the containers with an indexing motion under the punching press of the trimming machine; and the guide means comprises a plurality of guide ways in registry with each container holder at the container-removing station extending upwardly in an arc away from the holder and pushing means acting upwardly through the container holders to push the containers up into the guide ways and out into the troughs of the feeding mechanism of the trimming machine.

In accordance with a further preferred embodiment of the invention, the container-holding means comprises a plurality of baskets mounted for sliding movement between the stations and with respect to each other, and spacing means interconnecting adjacent container holders and defining inner and outer limits for the spacing between the holders corresponding to the spacing of the containers discharged from the molding machine and the spacing required for feeding of the containers to the trimming machine. It is to be understood that both the foregoing general description and the following detailed description are exemplary and explanatory but are not restrictive of the invention.

The accompanying drawings which are incorporated in and constitute a part of the specification illustrate an embodiment of the invention and together with the description serve to explain the principles of the invention.

Of the drawings:

FIG. 5 is a front elevational view of the container baskets at the container-removing station looking in the direction of arrows 5—5 of FIG. 2;

FIG. 7 is a side sectional view taken along the lines 7—7 of FIG. 5;

FIG. 9 is an enlarged fragmentary and schematic view of one of the guide ways shown in FIG. 8; and FIG. 10 is an enlarged fragmentary view of one of the container baskets.

Figure 1:
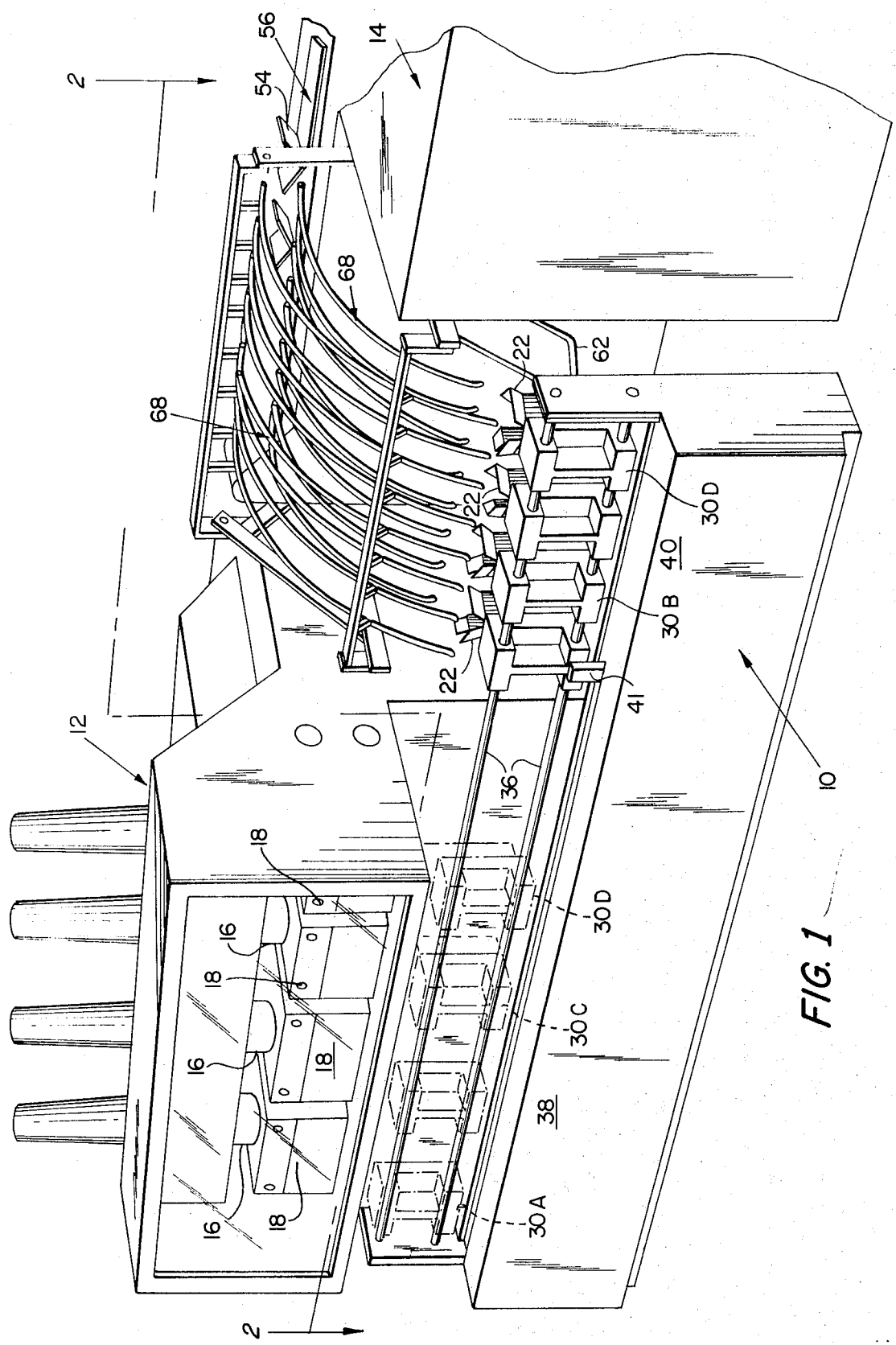
FIG. 1 is a perspective view of the transfer apparatus of the present invention illustrated in combination with a blow-molding machine and a trimming machine.

Reference will now be made in detail to the present preferred embodiment of the invention, an example of which is illustrated in the accompanying drawings.

For the purpose of clarity and simplification, only those parts of the mechanisms for molding the containers and for trimming flash from the molded containers that are essential to an understanding of the present invention have been illustrated in the drawings.

As discussed above, the apparatus of the present invention is particularly adapted for use with hollow, handle-ware containers, in which it is necessary to punch out the handle flash as well as neck and base flash as opposed to containers having only neck and base flash, where the containers simply can be passed over and/or under impacting apparatus to remove the flash. It will be appreciated by those skilled in the art that the apparatus can be used with any type of molded plastic products that needs to be trimmed in a specific manner and in which it is desirable to provide a continuous operating process for the manufacture of the molded containers to a point where they can be passed to a filling machine or to storage.

As shown in FIG. 1, there is illustrated the transfer apparatus of the present invention, generally indicated as 10, and located between a molding machine 12 for forming blow-molded containers and a trimming machine 14. Briefly, the transfer mechanism 10 receives a plurality of molded plastic products, such as hollow, handle-ware molded containers, from blow-molding machine 12 in an upright and spaced-apart position and transfers them to a horizontal and differently spaced-apart position for feeding to trimming machine 14 for deflashing of the handle-ware, base and neck flash.

Molding machine 12 is conventional, and exemplary of a molding machine is a blow-molding machine having a plurality of extrusion nozzles 16 and corresponding molds 18 that blow mold four (4) containers simultaneously. Upon completion of the formation of the containers, molds 18 separate and the formed containers drop down out of the molds in an upright and spaced-apart position corresponding to the spacing of molds 18. The operation of the machine and the blowing of the parisons in the mold to form the containers are well known to those skilled in the art so that it is believed that no more detailed explanation needs to be given.

Reverting to FIG. 1, and in accordance with the present invention, there is located beneath each pair of molds 18 a container-holding means indexed into container-receiving position with each pair of molds 18. As embodied, and also with reference to FIG. 10, the handle-ware containers 20 discharged from molding machine 12 generally are circular in shape and so the holding means comprises a generally rectangular-shaped basket 22, having straight side walls 24 and sloping top walls 26 that open outwardly from the top of the basket to catch the containers as they drop down out of the molds. Baskets 22 are mounted by a pair of suitably shaped top and bottom brackets 27 and 28, respectively, to one side of a basket support block 30. The baskets 22 are open at the top and front as shown in FIG. 10, and bottom bracket 28 extends partially across the bottom of basket 22 to provide a ledge 29 for receiving and holding a container within the basket. The bracket 28 extends only partially across the bottom of basket 22 so as not to interfere with the base flash 31 extending downwardly from the bottom of the molded container 20.

Figure 2:
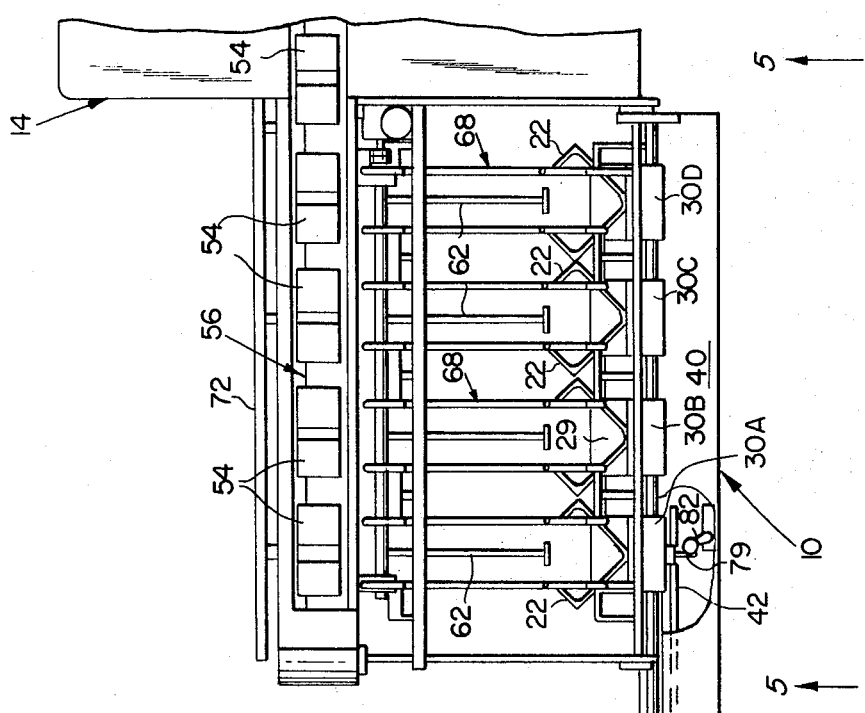
FIG. 2 is a broken, top-sectional view of the transfer apparatus taken along the lines 2—2 of FIG. 1.
Figure 2:
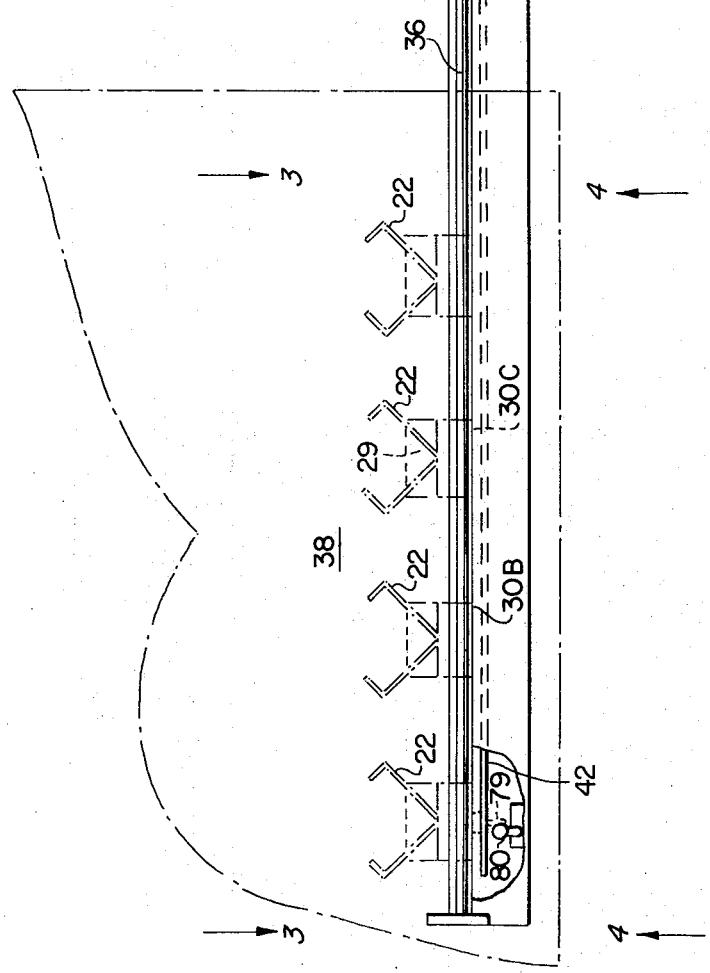
Figure 3:
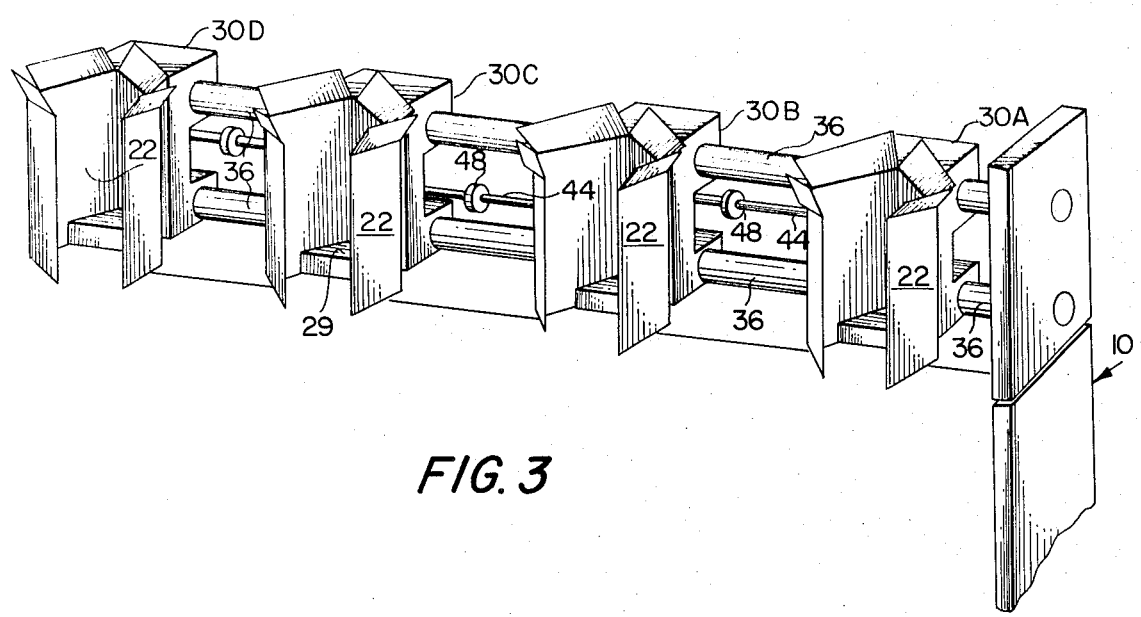
FIG. 3 is a perspective view of the container baskets at the container-receiving station looking in the direction of arrows 3—3 of FIG. 2.
Figure 4:
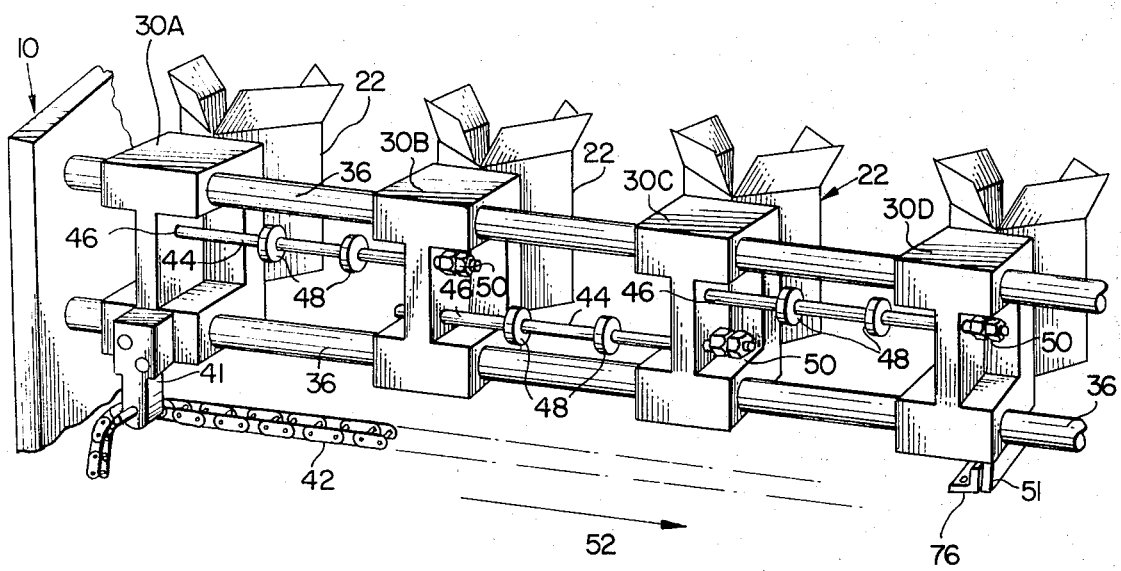
FIG. 4 is a perspective view similar to FIG. 3 but looking in the direction of arrows 4—4 of FIG. 2.
Figure 6:
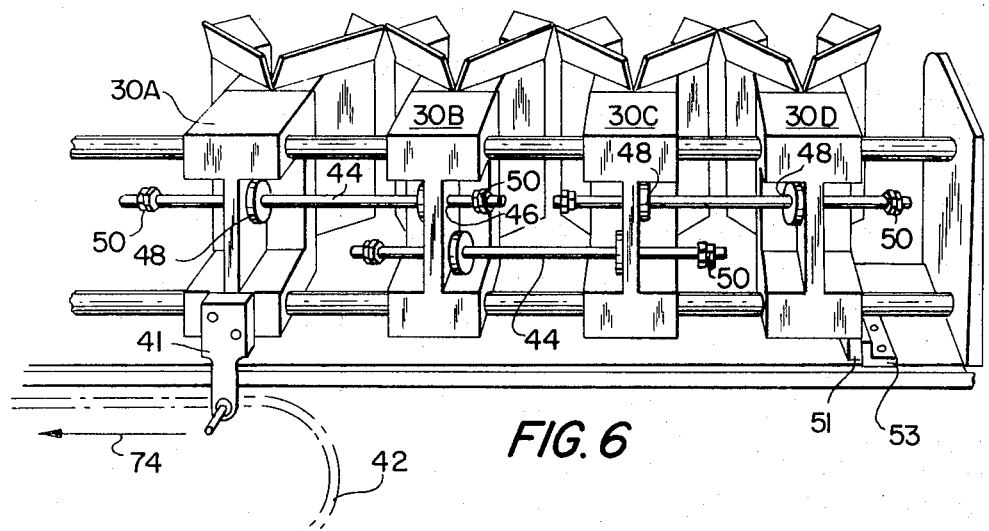
FIG. 6 is a perspective view of the container baskets at the container-removing station.

In accordance with the invention, transfer means are provided for reciprocating the container-holding means between the position beneath the molds of the molding machine and a position remote from the machine. As embodied, and as best shown in FIGS. 2-4, support blocks 30 of each container holding basket 22 are slidably mounted on a pair of guide rails 36 fixed to the frame of the transfer apparatus 10 for movement between the container-receiving station 38 and a container-removing station 40. As best shown in FIG. 4, trailing block 30A is connected by a bracket 41 to a movable, endless chain 42 and adjacent blocks 30B, 30C and 30D are interconnected by spacing means to adjust the spacing between container-holding baskets 22. As embodied, and as best shown in FIGS. 4 and 6, the spacing means comprises a rod 44 slidably mounted through apertures 46 in adjacent blocks 30 and having inner and outer stop blocks 48 and 50, respectively, fixed to rod 44 to limit the inner and outer spacing between the baskets 22 when they are pushed together or pulled apart. Preferably, stop blocks 48 and 50 are adjustable to permit adjustment of the limits for accommodating different molding machines or trimming machines as well as the size of the containers. Exemplary are adjustable nuts threaded to the ends of the rods to provide adjustable outer stop blocks 50 and rings having set screws to provide adjustable inner stop blocks 48.

Assuming container baskets 22 are at container-receiving station 38 and in the position shown in FIG. 4, as chain 42 is driven to the right and in the direction of arrow 52, the chain will push container support block 30A toward adjacent support block 30B until inner stop blocks 48 on corresponding rod 44 abut against the two blocks 30A and 30B, thus narrowing the spacing between the two blocks and their attached baskets 22. Further movement of chain 42 will then push both support blocks 30A and 30B in the direction of arrow 52 until all the blocks and their attached baskets 22 have been pushed together to their narrower spacing as defined by inner stop blocks 48 and to the container-removing station 40 remote from the blow-molding machine (See FIGS. 1 and 2). Upon reaching station 40, a dog on block 30D engages an adjustable stop block 53 to limit the movement of the baskets and to place them in proper position for removal of the containers 20. Inner stop blocks 48 are fixed to rods 44 so that the spacing between all container baskets 22 corresponds to the spacing required for feeding of the containers to trimming machine 14.

Figure 8:
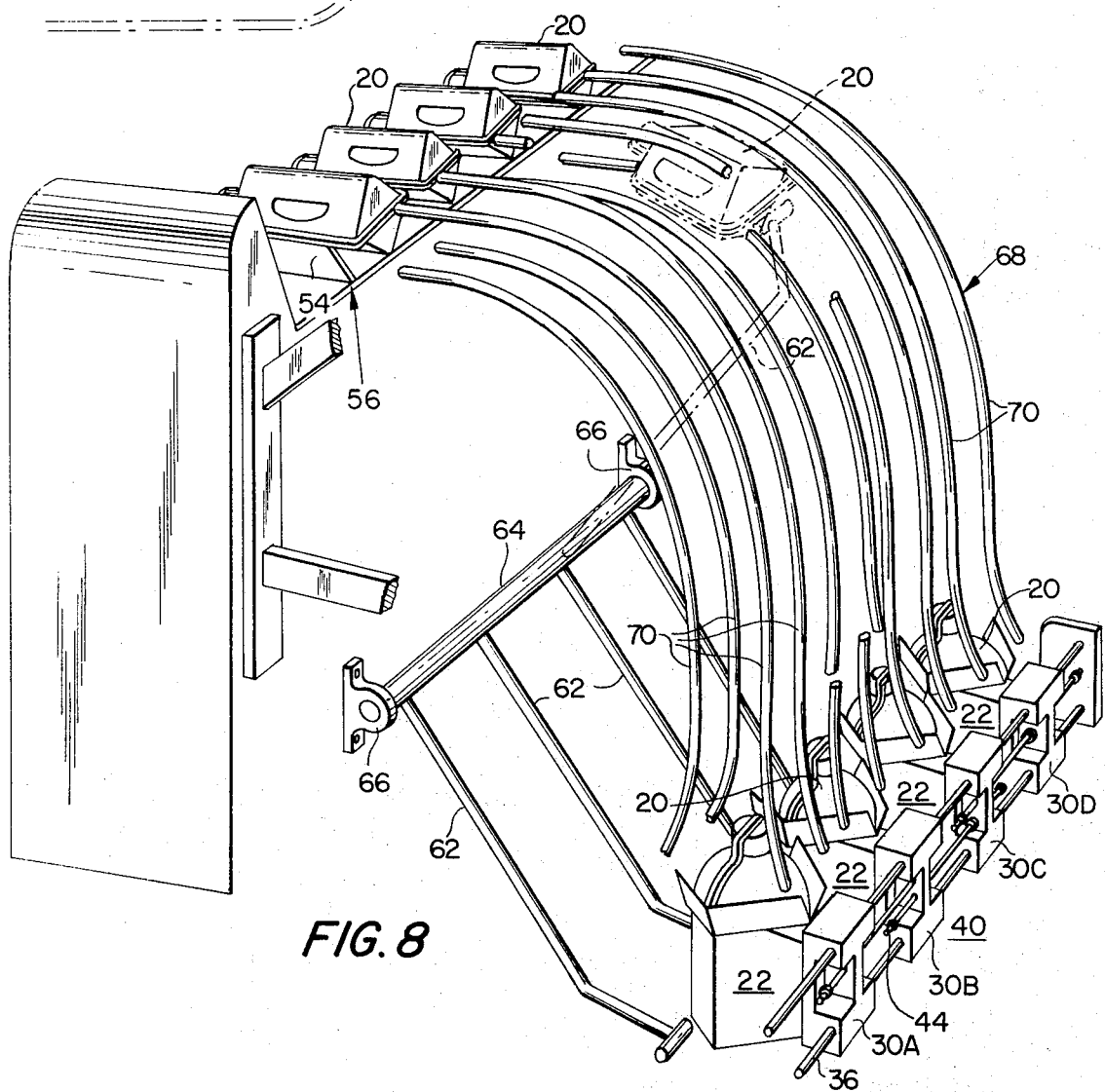
FIG. 8 is a perspective view of the guide ways and their relationship between the container baskets at the container-removing station and the feeding mechanism of the trimming machine.

When baskets 22 carrying four (4) handle-ware jugs 20, as shown in FIG. 8, reach container-removing station 40 and have now been pushed closer together to their narrower spacing, as defined by inner stop blocks 48, each container will be simultaneously removed from its basket and moved through a guide means to re-orient the container into a horizontal position for feeding to trimming machine 14. In accordance with the invention, the containers are lifted out of the baskets by a pushing means acting through the container baskets to push the containers up into the guide means and out onto the troughs 54 of a container feeding mechanism 56 for trimming machine 14. As embodied, the pushing means comprises a plurality of arms 62, corresponding to the number of containers simultaneously produced by the molding machine, connected to a rod 64 that is journalled at 66 to the frame of trimming machine 14. As best shown in FIG. 7, arms 62 rotate between a first position beneath the bottom of a container 20 in basket 22 and a second position where the arm pushes the containers into the troughs 54 of feeding mechanism 56 of the trimming apparatus.

As best shown in FIGS. 7-9, the guide means comprises a guide way 68 in registry with each basket 22 at container-removing station 40 and consisting of a plurality of spaced rods 70 that flare outwardly at the bottom over baskets 22 at container-removing station 40 to prevent binding of the containers as they are pushed up into guide ways 68 by arms 62 and which arc upwardly into a horizontal direction to deliver the containers onto the feeding mechanism 56 in a horizontal position for feeding to trimming machine 14.

Suitable stop means, such as bar 72 (see FIGS. 2, 5 and 9), is provided opposite the discharge end of guide ways 68 to prevent the containers 20 from being pushed off container-feeding mechanism 56 by arm 62 and to help settle the containers within the troughs 54.

After discharge of the containers into feeding mechanism 56 of the trimming machine and the return of arms 62 to their initial position, chain 42 is driven in the opposite direction to pull container baskets 22 back to container-receiving station 38. As chain 42 moves to the left as shown by arrow 74 in FIG. 6, it pulls container support block 30A to the left until outer stop blocks 50 of the rod 44 connecting support blocks 30A and 30B abut against their respective blocks. Further movement of chain 42 then pulls both support blocks 30A and 30B to the left and so on until all the blocks and their attached container baskets have been pulled apart to their wider spacing as defined by outer stop blocks 50 and have returned to the container-receiving station 38 beneath the molding machine 12. To prevent the baskets from overshooting their proper position at container-receiving station 38 during this return movement, stop block 76 as shown in FIG. 4 is provided on the frame of transfer apparatus 10 that is engaged by dog 51 attached to container support block 30D. Stop block 76 is positioned so that it is engaged by dog 51 when chain 42 and container support block 30A are at their farthest most position to the left as shown in FIG. 4, thereby providing the proper spacing and alignment of the container baskets 22 with the molds 18 of the blow-molding machine (see FIG. 1).

In keeping with the concept of this invention, machine cycling means are provided for driving chain 42 and attached baskets 22 along guide rails 36 with a reciprocating motion between container-receiving station 38 and container-removing station 40, for actuating arms 62 at the appropriate time to lift the containers out of baskets 22, move them through guide ways 68, and push them onto the container feeding mechanism, and for synchronizing such movements with the operations of the molding machine and the trimming machine.

As embodied, this machine cycling means includes limit switches 80 and 82 (see FIG. 2) for controlling movement of chain 42 and limit switches 84 and 86 (see FIG. 7) for limiting the movement of arms 62. Since it will be readily apparent to any person skilled in the art that any suitable cycling system may be used to control the individual operation of the various mechanisms, it is not believed that any further detailed explanation of the machine cycling means is necessary.

In operation, and with reference to FIGS. 1-4, a plurality of handle-ware, blow-molded containers are simultaneously dropped from molds 18 of blow-molding machine 12 where they are caught and held in upright position by the container baskets 22 at container-receiving station 38. The machine cycling means geared to a set time delay based on the opening of molds 18, then activates chain 42 in the direction of arrow 52 (see FIG. 4) pushing baskets 22 closer together to their narrower spacing as defined by inner stop blocks 48 and toward container-removing station 40 remote from molding machine 12.

When container support block 30A reaches its proper position at container-removing station 40, an arm 79 on block 30A trips limit switch 82 (see FIG. 2) which stops chain 42 and actuates arms 62 to lift all of the containers simultaneously up out of their baskets 22, through guide ways 68, and into the troughs 54 of container feeding mechanism 56 (see FIGS. 8 and 9). As arms 62 reach their upper limit, switch 86 is tripped causing the machine cycling means to stop arms 62 and rotate them back down to their initial position. Upon reaching their initial position, switch 84 is tripped, which stops arms 62 and actuates chain 42 to move in the direction of arrow 74 (see FIG. 6) and to return baskets 22 now empty to their spaced-apart position beneath blow-molding machine 12.

When container support block 30A reaches its proper, at-the-container-receiving position beneath molding machine 12, arm 79 trips limit switch 80 (see FIG. 2), stopping chain 42 and de-actuating the transfer apparatus 10 until it is re-actuated again by the opening of molds 18.

After containers 20 have been pushed out of guide ways 68 and onto container feeding mechanism 56, the tripping of switch 86 also actuates container feeding mechanism 56 to advance the four (4) containers now the proper spacing and position in troughs 54 with an indexing motion through a punch press (not shown) of trimming machine 14 while simultaneously bringing four (4) new empty troughs into registration with guide ways 68 for the next transfer cycle. In the trimming machine, the handle-ware flash as well as any neck and base flash is removed and the finished containers are ready for filling or storage.

Thus, it can be seen that the present invention provides an apparatus for automatically transferring blow-molded plastic products, and particularly blow-molded, handle-ware containers, from a blow-molding machine to a handle-ware trimming machine in an efficient, continuous, and automatic manner, thereby providing an increase in the speed, accuracy, and economy of an entire manufacturing operation to the point where the containers are ready to be filled or placed in storage.

The invention in its broader aspects is not limited to the specific details shown and described and departures may be made from such details without departing from the principles of the invention and without sacrificing its chief advantages.

What is claimed is:

1. Apparatus for transferring molded plastic containers from a container molding machine to the feeding mechanism of a trimming machine, in which a plurality of molded containers is simultaneously discharged from the molding machine in a vertical, spaced-apart position and are fed to the feeding mechanism of the trimming machine in a horizontal and differently spaced-apart position, said transfer apparatus comprising:

a. a plurality of container-holding means located at a container-receiving station adjacent the molding machine for simultaneously receiving the plurality of containers discharged from the molding machine;

b. transfer means simultaneously reciprocating the container-holding means between the container-receiving station and a container-removing station remote from the molding machine;

c. spacing means for adjusting the spacing between the container-holding means during transfer between said stations to the spacing required for the trimming machine; and d. guide means at said container-removing station for simultaneously removing the plurality of containers from the container-holding means orienting them to a horizontal position, and feeding them onto the feeding mechanism of the trimming machine.

2. Apparatus for transferring molded plastic containers from a container molding machine to the feeding mechanism of a trimming machine, in which a plurality of molded containers is simultaneously discharged from the molding machine in a vertical, spaced-apart position and are fed to the feeding mechanism of the trimming machine in a horizontal and differently spaced-apart position, said transfer apparatus comprising:

a. a plurality of container-holding means located at a container-receiving station adjacent the molding machine for simultaneously receiving the plurality of containers discharged from the molding machine;

b. transfer means slidably reciprocating the container-holding means between the container-receiving station and a container-removing station remote from the molding machine;

c. spacing means interconnecting adjacent container-holding means and defining inner and outer limits corresponding to the spacing of the containers discharged from the molding machine and the spacing required for feeding the containers to the trimming machine; and d. guide means at said container-removing station for simultaneously removing the plurality of containers from the container-holding means orienting them to a horizontal position, and feeding them onto the feeding mechanism of the trimming machine.

3. The apparatus of claim 2, wherein the guide means includes an arcuate guide way aligned with each of the container-holding means at the container-removing station to move the containers from a vertical to a horizontal position.

4. The apparatus of claim 3, wherein the feeding mechanism of the trimming machine is located above the plane of the container-holding means, and the guide means further includes pushing means for pushing the containers up out of the container-holding means, into and through the arcuate guide ways, and onto the feeding mechanism of the trimming machine.

5. The apparatus of claim 4, wherein the pushing means comprises a plurality of arms pivotally mounted for rotation between a first position beneath the bottom of the containers in the container-holding means, said arms rotating upwardly through the container-holding means and the arcuate guide ways to a second position where they simultaneously push the plurality of containers out of the guide ways and onto the feeding mechanism of the trimming machine.

6. The apparatus of claim 2, wherein the container-holding means comprises a plurality of baskets open at the top for receiving the containers discharged in a downward direction from the molding machine and for holding the containers in a vertical position.

7. The apparatus of claim 2, wherein the spacing means comprises a rod slidably mounted through adjacent container-holding means and having inner stop blocks adjustably fixed to the rod to limit the narrower spacing between the container-holding means when they are pushed together, and outer stop blocks adjustably fixed to a rod to limit the wider spacing between the container-holding means when they are pulled apart.

8. The apparatus of claim 7, wherein the containers are discharged from the molding machine at the wider spacing and fed to the trimming machine at the narrower spacing and the transfer means pushes the container-holding means together during transfer to the container-removing station and pulls them apart during transfer back to the container-receiving station.

9. The apparatus of claim 8, wherein the transfer means is connected to the trailing container-holding means to thereby push them together as they move toward the container-removing station and to pull them apart as they reciprocate back toward said container-receiving station.

10. The apparatus of claim 9, including first fixed stop means engaging the leading container-holding means at the container-removing station so that the transfer means will push them together to their narrower spacing for alignment with the guide means, and second fixed stop means engaging the leading container-holding means at the container-receiving station so that the transfer means will pull them apart to their wider spacing for alignment with the molding machine.

* * * * *